(12) United States Patent
Durr et al.

(10) Patent No.: US 10,759,236 B2
(45) Date of Patent: Sep. 1, 2020

(54) WHEEL FOR AN AIR MAINTENANCE TIRE SYSTEM

(71) Applicant: The Goodyear Tire & Rubber Company, Akron, OH (US)

(72) Inventors: Michael Joseph Durr, Stow, OH (US); Cheng-Hsiung Lin, Hudson, OH (US); Christopher Paul Hunt, Stow, OH (US); Arun Kumar Byatarayanapura Gopala, Copley, OH (US); Christian Alfonso Lombardi, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 300 days.

(21) Appl. No.: 15/952,351

(22) Filed: Apr. 13, 2018

(65) Prior Publication Data

US 2018/0319228 A1    Nov. 8, 2018

Related U.S. Application Data

(60) Provisional application No. 62/501,320, filed on May 4, 2017.

(51) Int. Cl.
  *B60C 23/12* (2006.01)
  *B60B 21/02* (2006.01)
  *B60B 21/12* (2006.01)

(52) U.S. Cl.
  CPC .............. *B60C 23/12* (2013.01); *B60B 21/02* (2013.01); *B60B 21/12* (2013.01); *B60B 2900/541* (2013.01)

(58) Field of Classification Search
  CPC ......... B60C 23/10; B60C 23/12; B60B 21/02; B60B 21/026; B60B 21/023
  (Continued)

(56) References Cited

U.S. PATENT DOCUMENTS 4,391,317 A * 7/1983 Savage ................... B60B 21/12
                                              152/381.5
4,651,792 A    3/1987 Taylor
(Continued)

FOREIGN PATENT DOCUMENTS

DE         2813601 A1    10/1979
DE     102013018126 A1     6/2015
EP        0855294 A3    12/1999

OTHER PUBLICATIONS

EPO search report completed Sep. 3, 2018 and received by Applicant Sep. 10, 2018.

*Primary Examiner* — Kip T Kotter
(74) *Attorney, Agent, or Firm* — Edward T. Kennedy

(57) ABSTRACT

A wheel for an air maintenance tire system is provided. The air maintenance tire system includes at least one pump and a regulator. The wheel includes a body that is formed with an axially-extending wall, a pair of flanges, and a pair of bead mounting areas. Each bead mounting area is disposed axially inwardly proximate a respective one of the flanges. The axially-extending wall is formed with an AMT mounting channel. The AMT mounting channel extends circumferentially about the wheel approximately mid-way between the flanges and is defined by a first adjacent wall, a second adjacent wall, and a base. Mounting surfaces are formed in or adjacent the AMT mounting channel, so that the at least one pump is mounted in the AMT mounting channel radially inwardly of the bead mounting areas.

17 Claims, 8 Drawing Sheets

(58) Field of Classification Search
USPC .................................... 301/5.24; 152/381.5
See application file for complete search history.

(56) References Cited

U.S. PATENT DOCUMENTS

| | | | |
|---|---|---|---|
| 5,409,049 A | 4/1995 | Renier | |
| 5,556,489 A | 9/1996 | Curlett et al. | |
| 5,707,215 A | 1/1998 | Olney et al. | |
| 6,691,754 B1 | 2/2004 | Moore | |
| 7,051,778 B2 | 5/2006 | Mancosu et al. | |
| 7,284,585 B2 | 10/2007 | Ogawa | |
| 7,322,392 B2 | 1/2008 | Hawes | |
| 8,186,402 B2 | 5/2012 | Eigenbrode | |
| 8,807,182 B2 * | 8/2014 | Kelly | B60C 23/12 152/419 |
| 8,960,249 B2 | 2/2015 | Lin | |
| 9,039,392 B2 | 5/2015 | Richardson et al. | |
| 9,114,674 B2 | 8/2015 | Hall | |
| 9,151,288 B2 | 10/2015 | Richardson et al. | |
| 9,222,473 B2 | 12/2015 | Richardson | |
| 9,327,562 B2 | 5/2016 | Lin | |
| 9,409,454 B2 | 8/2016 | Middelberg | |
| 9,505,278 B1 | 11/2016 | Gau et al. | |
| 9,682,599 B1 | 6/2017 | Hinque et al. | |
| 10,105,999 B2 | 10/2018 | McClellan | |
| 2003/0126918 A1 | 7/2003 | Chuang et al. | |
| 2004/0007302 A1 * | 1/2004 | Hamilton | B60C 23/12 152/416 |
| 2006/0283534 A1 | 12/2006 | Hawes | |
| 2008/0156406 A1 | 7/2008 | Breed | |
| 2014/0023518 A1 | 1/2014 | O'Brien et al. | |
| 2014/0271261 A1 | 9/2014 | Boelryk | |
| 2014/0366957 A1 | 12/2014 | Wang et al. | |
| 2015/0096657 A1 | 4/2015 | Bennett et al. | |
| 2015/0122390 A1 * | 5/2015 | Durr | B60C 23/12 152/450 |
| 2015/0147198 A1 | 5/2015 | Chawla et al. | |
| 2015/0147199 A1 | 5/2015 | Chawla et al. | |
| 2015/0314657 A1 | 11/2015 | Lin | |
| 2015/0375577 A1 | 12/2015 | Serbu et al. | |
| 2016/0167465 A1 * | 6/2016 | Hinque | B60C 23/12 152/419 |
| 2017/0015147 A1 | 1/2017 | McClellan | |
| 2017/0015156 A1 | 1/2017 | McClellan | |
| 2017/0015157 A1 | 1/2017 | McClellan | |
| 2017/0015159 A1 | 1/2017 | Richardson | |
| 2017/0174017 A1 | 6/2017 | Lin | |
| 2018/0086161 A1 | 3/2018 | Lin | |

* cited by examiner

WHEEL FOR AN AIR MAINTENANCE TIRE SYSTEM

FIELD OF THE INVENTION

The invention relates to wheels for air maintenance tire systems, which are systems that maintain appropriate air pressure within a pneumatic tire. More specifically, the invention relates to a wheel that enables mounting of components of an air maintenance tire system. The invention is directed to a wheel formed with features that enable components of an air maintenance tire system to be securely mounted to the wheel radially inward of a tire bead.

BACKGROUND OF THE INVENTION

Conventional pneumatic tires are designed to perform for relatively long periods of time. In many cases, automobile tires are now expected to have a useful service life of 30,000, 50,000 or 70,000 miles. However, even long-life pneumatic tires are subject to air pressure losses due to puncture by nails and other sharp objects, temperature changes, and/or diffusion of air through the tire itself.

Since air diffusion reduces tire pressure over time, the pneumatic tires may repeatedly become underinflated. Accordingly, drivers must in turn repeatedly act to maintain recommended air pressures in the vehicle tires to avoid reduced fuel economy, tire life, and/or vehicle braking and handling performance. Tire pressure monitoring systems (TPMS) are automated systems that have been proposed to warn drivers when the air pressure in the vehicle tires is significantly low. Such systems, however, remain dependent upon a driver taking remedial action, when warned, to re-inflate a tire to the recommended pressure. It had thus been desirable in the prior art to incorporate an air maintenance feature within a pneumatic tire that would maintain a predetermined or recommended air pressure without requiring driver intervention.

To this end, air maintenance tire (AMT) systems have been developed. An AMT system typically includes one or more pumps or pumping assemblies that act to increase the air pressure in the vehicle tires as needed. In such AMT systems, a pumping mechanism is in fluid communication with the tire cavity. The pumping mechanism compresses air, which is then directed into the tire cavity.

For certain applications, it has been determined that an AMT system which includes components that do not require modification of the tire may be advantageous. However, it is desirable for the pumping mechanism to be disposed proximate the tire, such as on the wheel, while not interfering with assembly of the tire onto a wheel. For example, when it is proposed to mount certain components of an AMT system to a wheel, the components must allow for proper mounting of the tire on the wheel through normal mounting procedures. This may pose an issue in the construction of the AMT system, as original wheel designs typically do not have mounting surfaces for AMT components built into the wheel. It is to be understood that reference herein shall be made to the word "wheel" with the understanding that such reference includes alternate terminology that is sometimes employed in the art, such as "rim" and the like.

As a result, there is a need in the art for a wheel formed with features that enable components of an AMT system to be securely mounted to the wheel, while allowing a tire to be mounted on the wheel without interference from the AMT system components.

SUMMARY OF THE INVENTION

According to an aspect of an exemplary embodiment of the invention, a wheel for an AMT system is provided. The AMT system includes at least one pump and a regulator. The wheel includes a body that is formed with an axially-extending wall, a pair of flanges, and a pair of bead mounting areas. Each bead mounting area is disposed axially inwardly proximate a respective one of the flanges. The axially-extending wall is formed with an AMT mounting channel. The AMT mounting channel extends circumferentially about the wheel between the flanges and is defined by a first adjacent wall, a second adjacent wall, and a base. A plurality of mounting surfaces are formed in or adjacent the AMT mounting channel, and the at least one pump is mounted on a respective one of the AMT mounting surfaces radially inwardly of the bead mounting areas.

BRIEF DESCRIPTION OF THE DRAWINGS

The invention will be described by way of example and with reference to the accompanying drawings, in which.

Similar numerals refer to similar parts throughout the drawings.

Definitions

Figure 1:
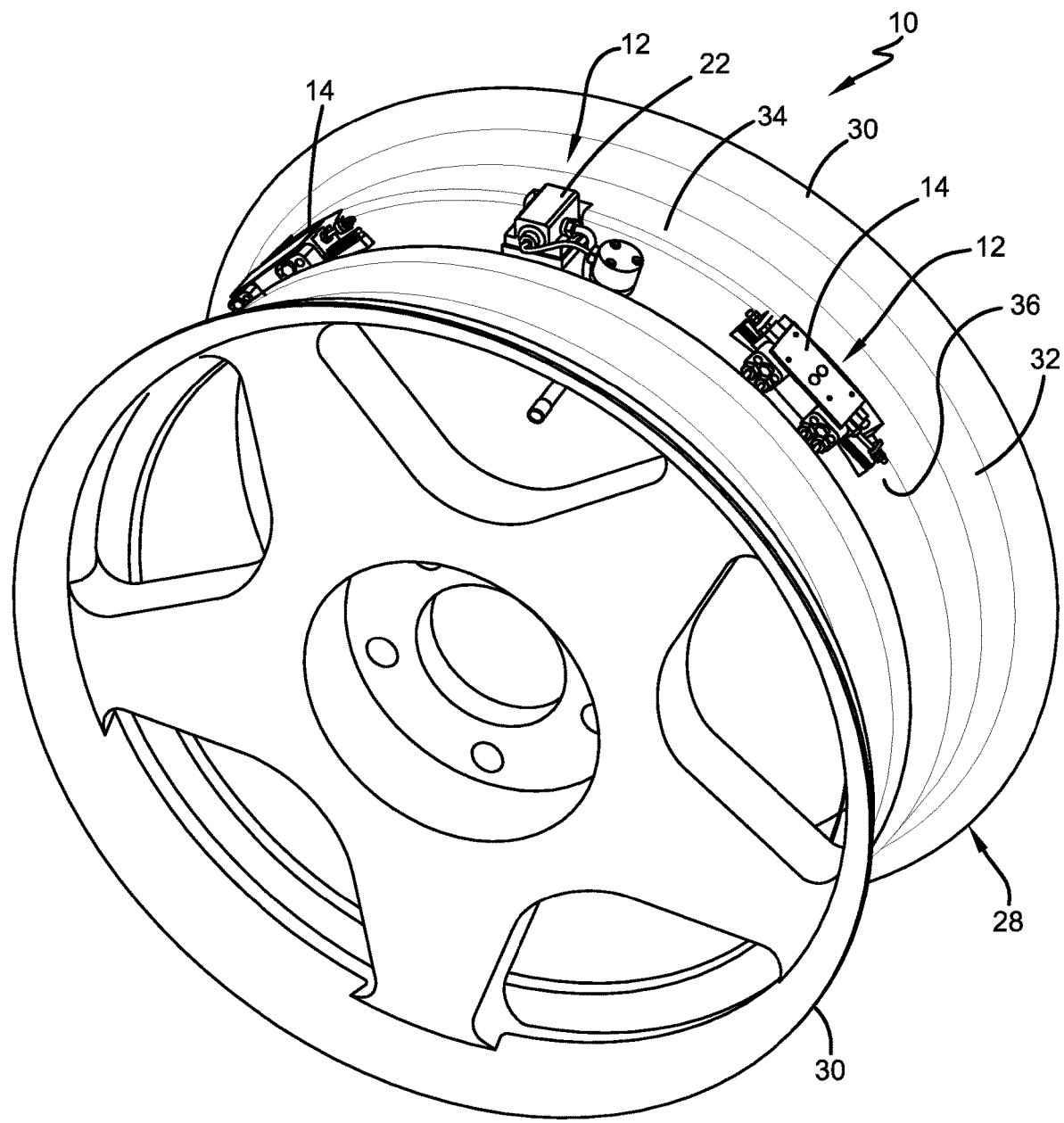
FIG. 1 is a perspective view of a first exemplary embodiment of a wheel for an AMT system of the present invention, showing certain components of the AMT system mounted thereon.
Figure 2:
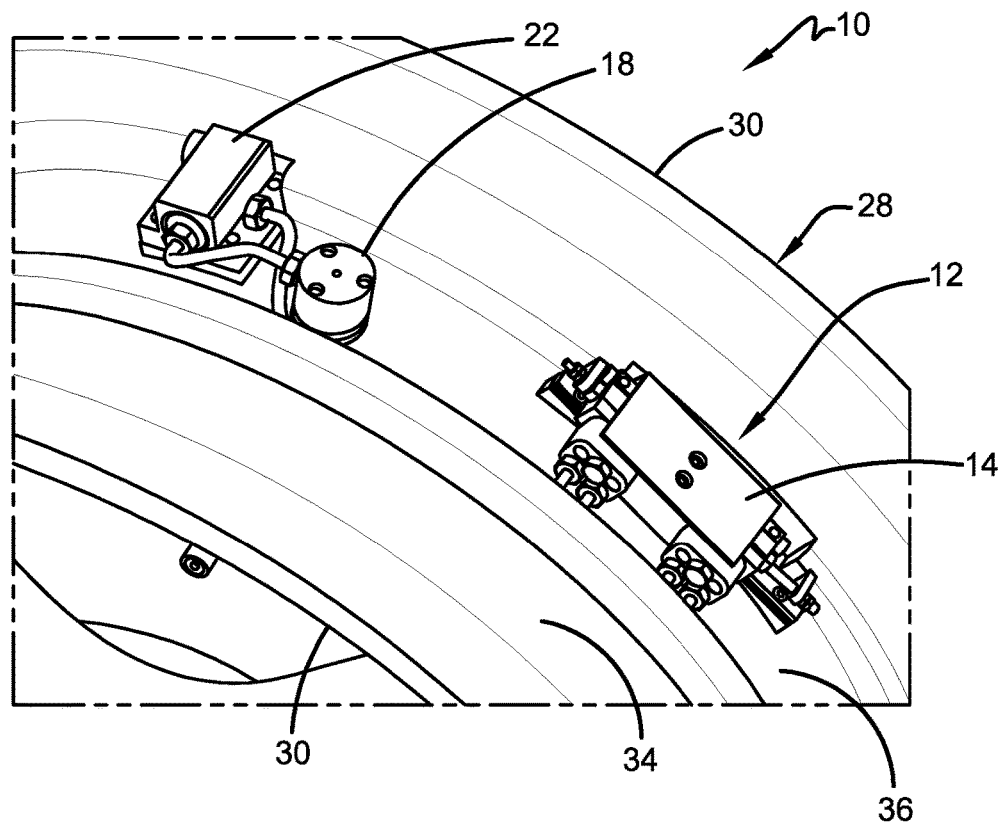
FIG. 2 is a fragmentary perspective view of a portion of the wheel and AMT components shown in FIG. 1.
Figure 3:
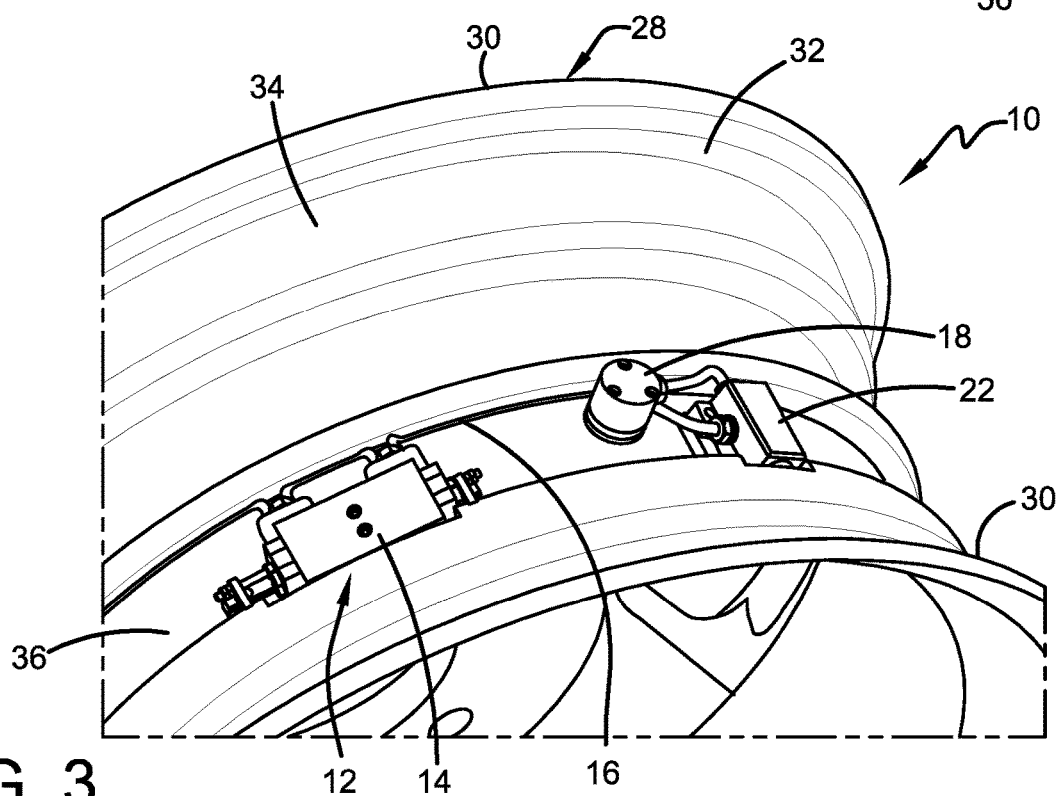
FIG. 3 is another fragmentary perspective view of a portion of the wheel and AMT components shown in FIG. 1.

"Affixed" means attached to a tire or joined to a tire by any means known to those skilled in the art, including adhesion, mechanical structures, integral forming in the tire, and the like.

"Axial" and "axially" means lines or directions that are parallel to the axis of rotation of the tire.

"Axially inwardly" means an axial direction that is toward the center plane of the tire.

"Axially outwardly" means an axial direction that is away from the center plane of the tire.

"Bead" means the part of a tire comprising an annular tensile member wrapped by ply cords and shaped, with or without other reinforcement elements, to fit the wheel.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length.

"Inboard side" means the side of the tire nearest the vehicle when the tire is mounted on a wheel and the wheel is mounted on the vehicle.

"Inboard" or "inboardly" means an axial direction corresponding to the inboard side of the tire.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Outboard side" means the side of the tire farthest away from the vehicle when the tire is mounted on a wheel and the wheel is mounted on the vehicle.

"Outboard" or "outboardly" means an axial direction corresponding to the outboard side of the tire.

"Radial" and "radially" means directions radially toward or away from the axis of rotation of the tire.

"Radially inwardly" means a radial direction that is toward the central axis of rotation of the tire.

"Radially outwardly" means a radial direction that is away from the central axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by a shape having adjacent grooves.

DETAILED DESCRIPTION OF THE INVENTION

Turning to FIGS. 1 through 8, a first exemplary embodiment of a wheel for an AMT system of the present invention is indicated at 10. A tire (not shown) is mounted on the wheel 10 in a conventional manner as known to those skilled in the art and defines a cavity. Components of an exemplary AMT system 12 are also mounted on the wheel 10, as will be described in greater detail below, and are disposed within the tire cavity.

With particular reference to FIGS. 1 through 5, the AMT system 12 includes, by way of example, at least one pump 14, which preferably is a linearly-actuating or shuttle pump. Preferably, two or more pumps 14 are pneumatically connected in series about the wheel 10 through a conduit or flexible line 16. Air is introduced into the AMT system 12 through an inlet, which is shown by way of example as a valve stem 18. The valve stem 18 optionally includes an air filter. The valve stem 18 is pneumatically connected to the inlet 20 of a regulator or controller 22 through a conduit or flexible line 24. An outlet 26 of the regulator 22 is pneumatically connected to a selected one of the pumps 14 through the conduit or flexible line 16.

In this manner, air is drawn into the AMT system 12 through the inlet or valve stem 18, communicated to the regulator 22, and to the pumps 14, which operate as the wheel 10 rotates to compress the air and thus amplify the air pressure in the system. Through the conduits or flexible lines 16, the air flow is increased in pressure due to such amplification by the pumps 14. In the case of a regulator 22 with a pneumatic outlet control, when the air completes the circuit around the wheel 10, it flows through a final conduit or flexible line into the regulator 22, which releases compressed air directly into the tire cavity on demand. In the case of a regulator 22 with a pneumatic inlet control, air is taken into the AMT system 12 on demand, is increased in pressure as it is compressed by the pumps 14, and upon reaching a last one of the pumps, the compressed air is released directly into the tire cavity.

It is to be understood that the invention is not limited to a specific structure or configuration of the pumps 14, regulator 22 and other components of the AMT system 12. Examples of pump configurations and other system components are described in U.S. Pat. No. 9,327,562; U.S. patent application Ser. No. 14/269,294; U.S. Patent Application Ser. No. 62/398,917; and U.S. Patent Application Ser. No. 62/398,981, all of which are owned by the same assignee as the present invention, The Goodyear Tire & Rubber Company, and all of which are incorporated herein by reference.

Figure 4:
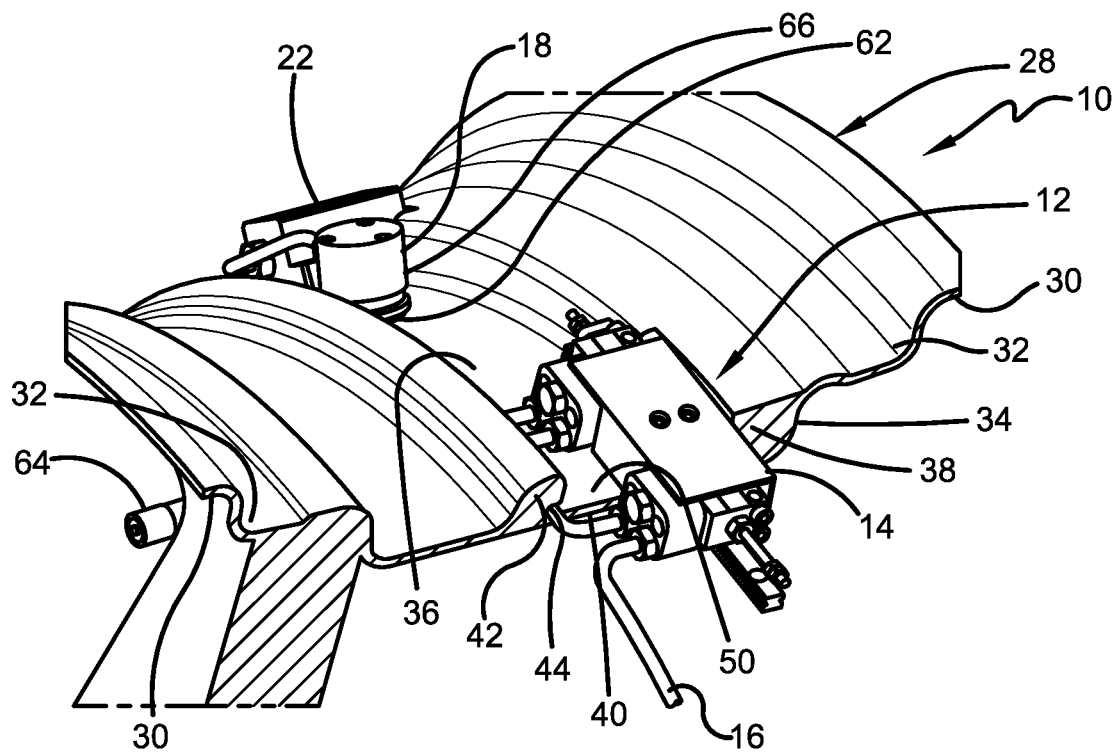
FIG. 4 is a fragmentary perspective view of a portion of the wheel, partially in cross section, and AMT components shown in FIG. 1.
Figure 5:
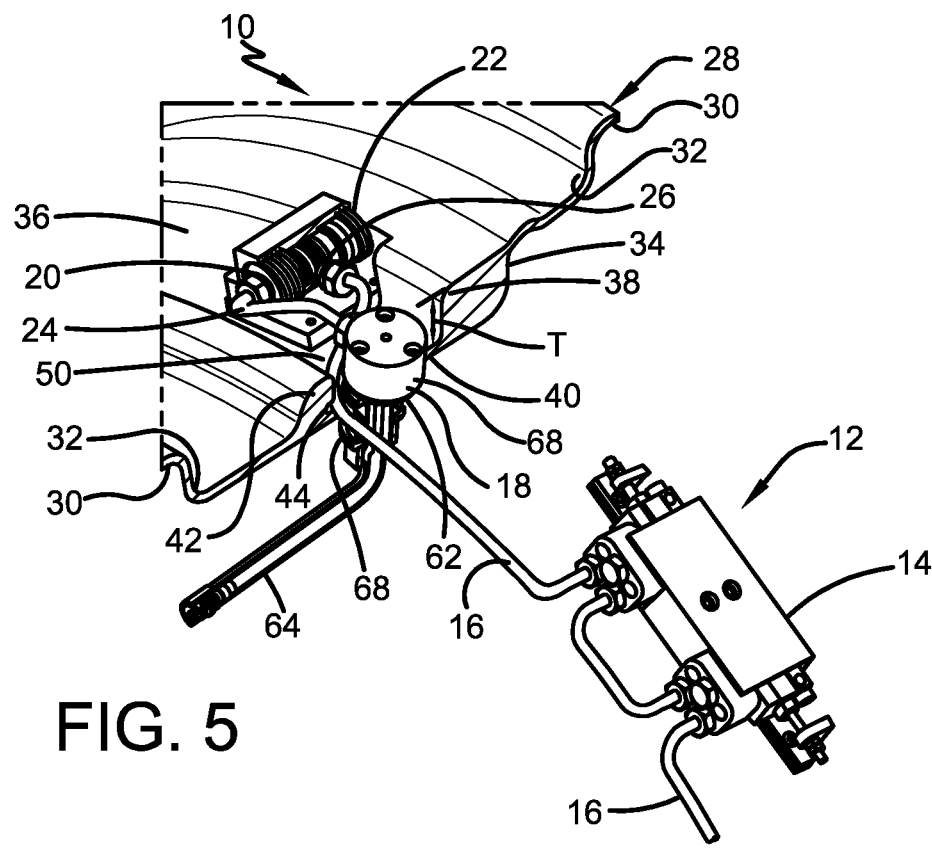
FIG. 5 is another fragmentary perspective view of a portion of the wheel, partially in cross section, and AMT components shown in FIG. 1.
Figure 6:
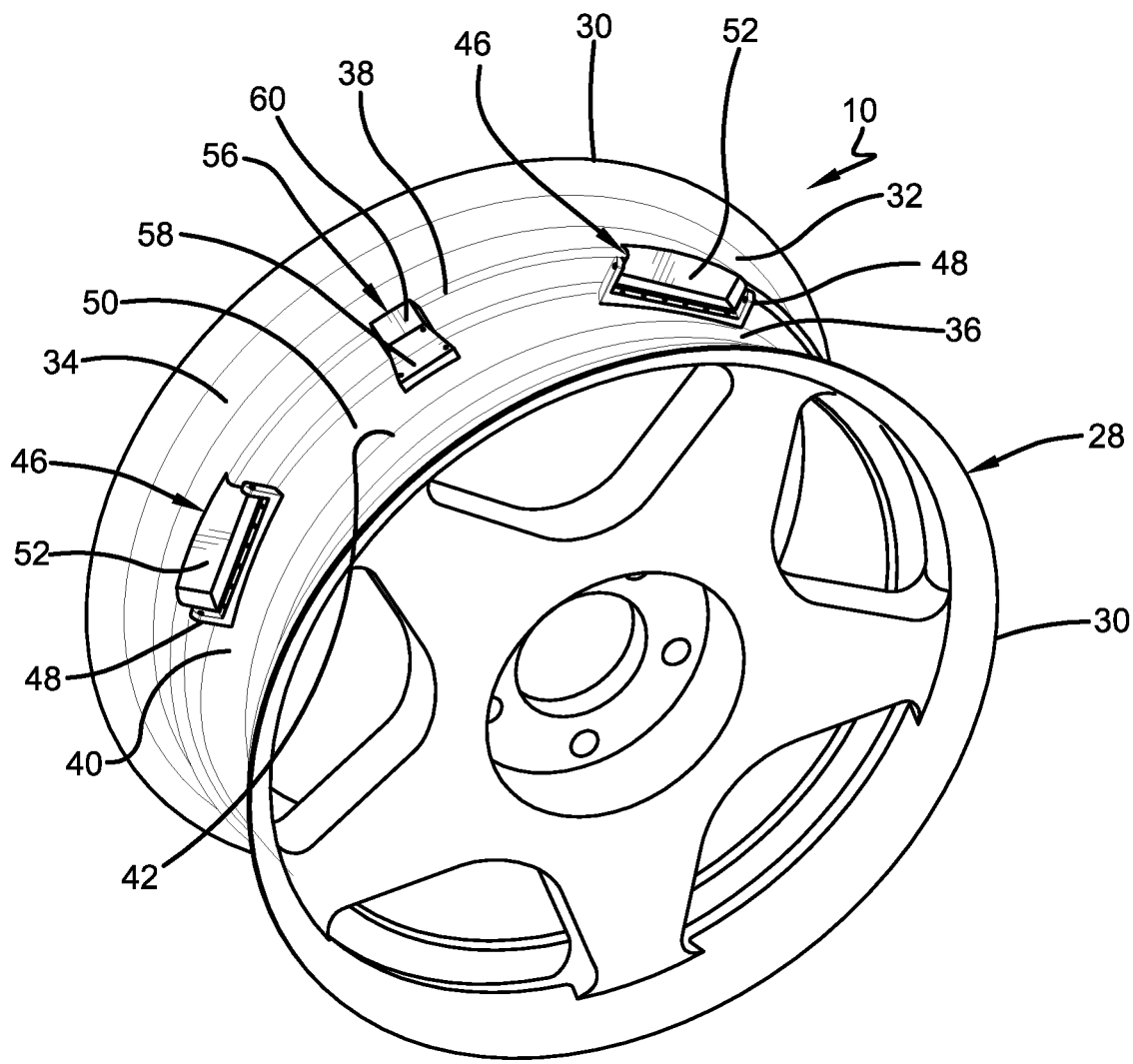
FIG. 6 is a perspective view of the wheel shown in FIG. 1 without components of the AMT system mounted thereon.

Referring now to FIGS. 4 through 6, the wheel 10 includes a body 28. The body 28 is formed with an axially-extending wall 34 and a pair of flanges 30. Disposed axially inwardly of each respective flange 30 is a respective bead mounting area 32. The bead mounting area 32 is the location on the wheel 10 on which the beads of the tire are seated when the tire is mounted on the wheel. Typically, it is undesirable to have a surface or component other than the flanges 30 extend radially outwardly past the bead mounting area 32, as it is best for components to be radially inwardly of the bead mounting area to enable smooth mounting of the tire on the wheel 10.

To accommodate the AMT system 12, the wheel 10 is formed with specific features. For example, a circumferential AMT mounting channel 36 is formed in the axially-extending wall 34 proximate or at the equatorial centerplane of the tire, and thus about mid-way between the flanges 30. In the prior art, the axial wall was a thick wall which prevented ready mounting of components radially inward of the bead mounting areas 32. By forming the AMT mounting channel 36, components of the AMT system 12, such as the pumps 14 and the regulator 22, may be mounted radially inwardly of the bead mounting areas 32.

As mentioned above, the AMT mounting channel 36 extends circumferentially about the entire wheel 10, and is of a depth or thickness T that is less than that of a first adjacent wall 38. An inner diameter of a radially inward wall 40 of the AMT mounting channel 36 is generally the same as an inner diameter of the first adjacent wall 38. With such a depth T and an inner diameter, the radially inward wall 40 preserves the inner diameter of the wheel 10, thereby enabling mounting of the wheel over brake components without modification of the brake system or other systems. A second wall 42 is adjacent the AMT mounting channel 36 opposite the first wall 38. The first wall 38 and second wall 42 form circumferential walls or ribs about the AMT mounting channel 36 to preserve the strength of the wheel 10. In this manner, the AMT mounting channel is defined by the first adjacent wall 38, the second adjacent wall 42, and a base 50 formed by the radially inward wall 40.

Formed in the second wall 42 proximate the base 50 of the AMT mounting channel 36 is a circumferentially-extending feature or groove 44. The groove 44 receives and engages the conduit or flexible tube 16 to retain the position of the conduit about the wheel 10, and to protect the conduit. Preferably, the groove 44 is formed with an interference fit in relation to the outside diameter of the conduit 16 to enable the conduit to snap into the groove and remain in the groove.

Figure 7:
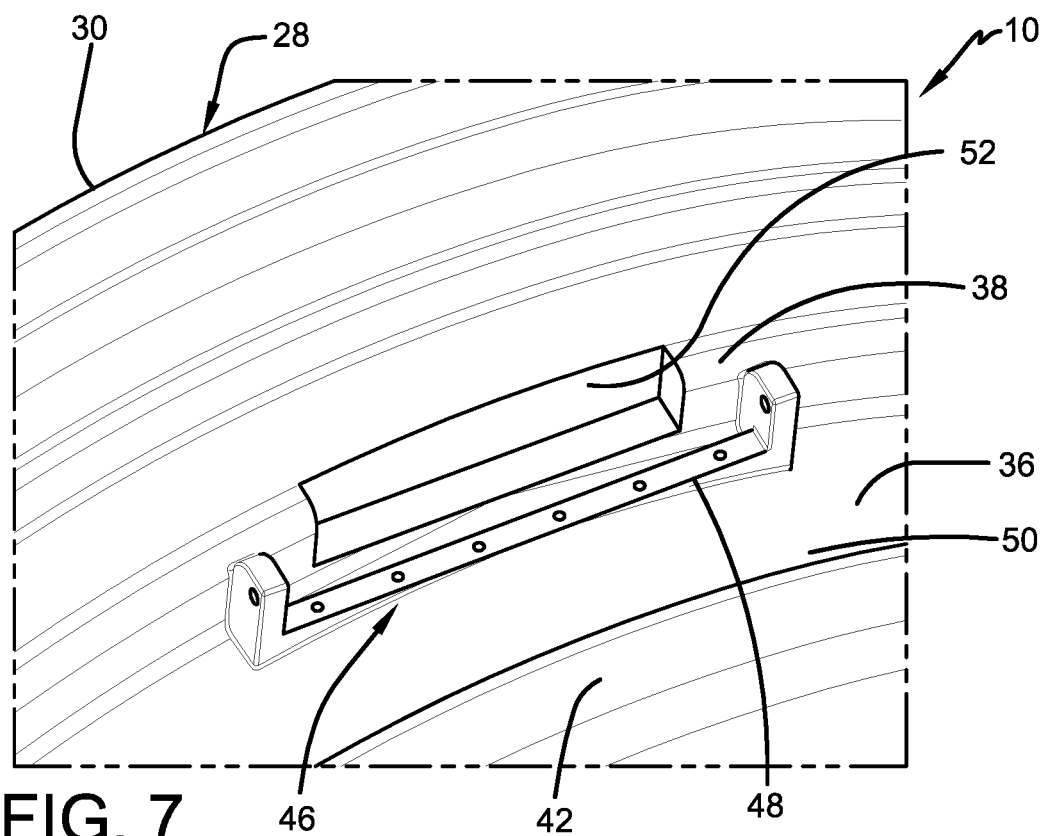
FIG. 7 is a fragmentary perspective view of a portion of the wheel shown in FIG. 6.
Figure 8:
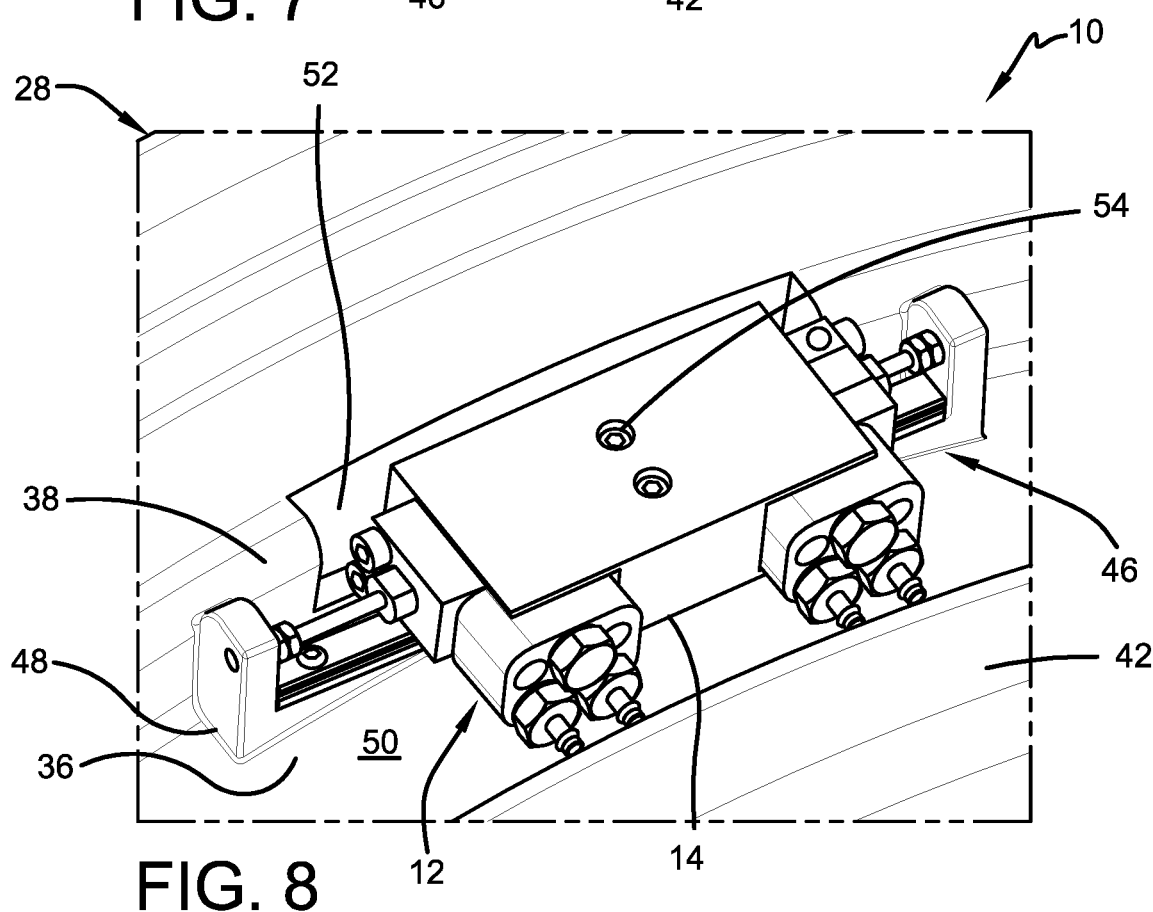
FIG. 8 is a fragmentary perspective view of a portion of the wheel similar to FIG. 6, with an AMT component mounted thereon.

Turning to FIGS. 6 through 8, to provide a stable mounting area for each pump 14, a flat pump mounting surface 46 is formed in the AMT mounting channel 36 and the first wall 38. More particularly, the surface of the wheel body 28 is curved, and it is desirable for each pump 14 to be mounted on a flat surface. The pump mounting surface 46 includes a boss structure 48 that is formed or mounted on the base 50 of the AMT mounting channel at the location for each pump 14. The pump mounting surface 46 also includes a cutout 52 formed in the first wall 38 facing the AMT mounting channel 36 and proximate the boss structure 48. The cutout 52 and the boss structure 48 cooperate to provide a flat mounting surface that supports the pump 14 and enables the pump to be secured to the wheel body 28 by mechanical fasteners 54. The boss structure 48 may be a separate component that is fastened or welded to the base 50 of the AMT mounting channel, or may be integrally formed by machining or casting. The cutout 52 may be formed by machining the first wall 38, or by casting.

With reference now to FIGS. 5 and 6, to provide a stable mounting area for the regulator 22, a flat regulator mounting surface 56 is formed in the AMT mounting channel 36 and the first wall 38. More particularly, the surface of the wheel body 28 is curved, and it is desirable for the regulator 22 to be mounted on a flat surface. The regulator mounting surface 56 includes a boss structure or plate 58 that is formed or mounted on the base 50 of the AMT mounting channel at the location for the regulator 22. The regulator mounting surface 56 also includes a cutout 60 formed in the first wall 38 facing the AMT mounting channel 36 and proximate the regulator boss structure 58. The cutout 60 and the boss structure 58 cooperate to provide a flat mounting surface that supports the regulator 22 and enables the regulator to be secured to the wheel body 28 by mechanical fasteners (not shown). The boss structure 58 may be a separate component that is fastened or welded to the base 50 of the AMT mounting channel, or may be integrally formed by machining or casting. The cutout 60 may be formed by machining the first wall 38, or by casting.

Turning to FIG. 5, as mentioned above, air is drawn into the AMT system 12 through the inlet or valve stem 18. An existing vehicle valve stem may be employed, which may be adjusted to draw air in to the regulator 22 on demand, or the above-described valve stem 18 may be used. For the valve stem 18, an opening 62 is formed in the base 50 or radially inward wall 40 of the AMT mounting channel 36, and preferably is a circular opening. The opening 62 enables the valve stem extend radially inwardly of the axial wall 34 of the wheel body 28, thereby providing a protected location for a radially inward portion 64 of the valve stem 18, while enabling a radially outward portion 66 of the valve stem to extend into the tire cavity. An adapter 68 preferably is provided to secure the valve stem 18 in the opening 62 and thus securely mount it to the wheel 10. Such a structure enables secure mounting of the valve stem 18 on the wheel, while providing a convenient air flow path into the regulator 22.

Optionally, the regulator 22 may be incorporated into the valve stem 18. An example of such a structure is described in U.S. patent application Ser. No. 14/946,005, which is owned by the same assignee as the present invention, The Goodyear Tire & Rubber Company, and which is incorporated herein by reference. Of course, if the regulator 22 is incorporated into the valve stem 18, the regulator mounting surface 56 described above may be modified or eliminated.

As another option, a cover may be provided that extends axially from the first wall 38 to the second wall 42 over the AMT mounting channel 36 radially outwardly of the components of the AMT system 12. Such a cover may protect the integrity of the components during installation of the tire onto the wheel 10, protect the integrity of the tire bead during installation, and/or enable a smooth installation of the tire onto the wheel.

In this manner, the invention provides a wheel 10 for an AMT system 12 that is formed to enable AMT system components to be mounted to the wheel radially inward of the bead seating areas 32 of the tire. Such a construction in turn enables secure and convenient mounting of AMT system components to the wheel 10 while allowing for mounting of the tire without interference. As described above, the construction of the wheel 10 allows for the mounting and fastening of multiple components of the AMT system 12, including one or more pumps 14, the regulator 22, and the valve stem 18. If required, components of a tire pressure monitoring system (TPMS) may also be mounted on the wheel 10 and incorporated into the structure of the AMT mounting channel 36. The structure of the wheel 10 also enables the components of the AMT system 12 to be oriented and spaced about the wheel to provide circumferential balance for the system.

Figure 9:
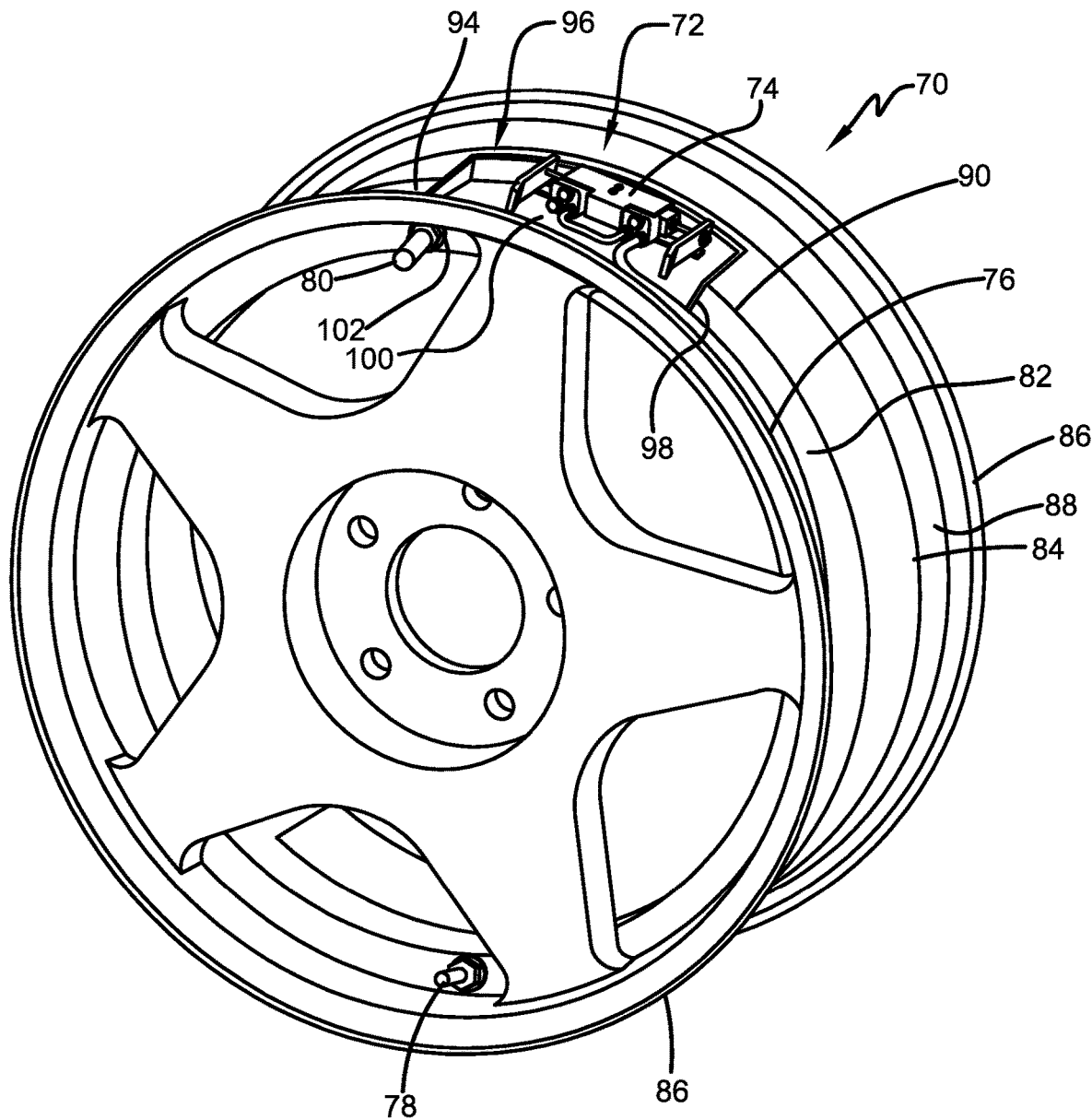
FIG. 9 is a perspective view of a second exemplary embodiment of a wheel for an AMT system of the present invention, showing certain components of the AMT system mounted thereon.
Figure 10:
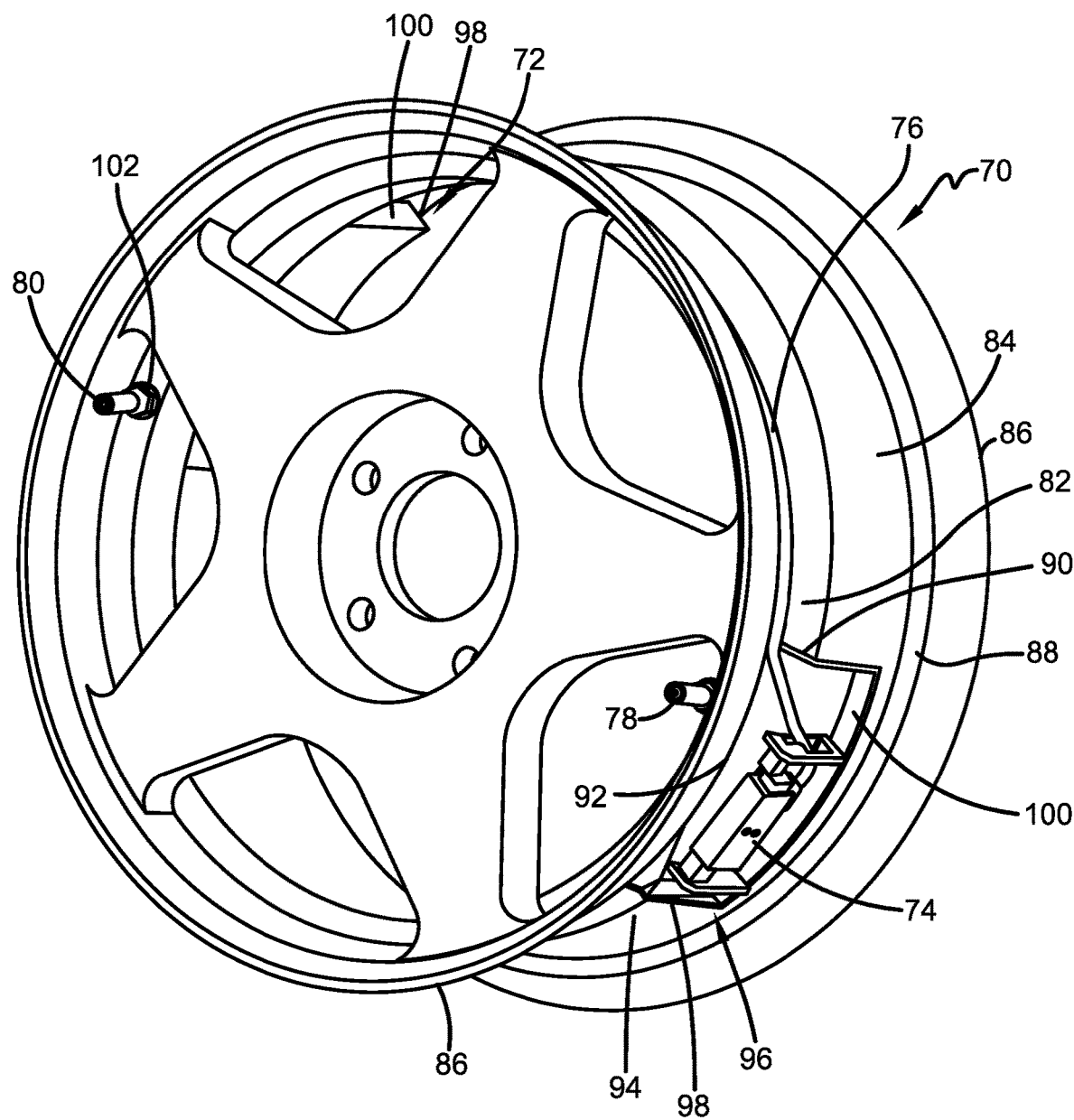
FIG. 10 is a second perspective view of the wheel shown in FIG. 9.
Figure 11:
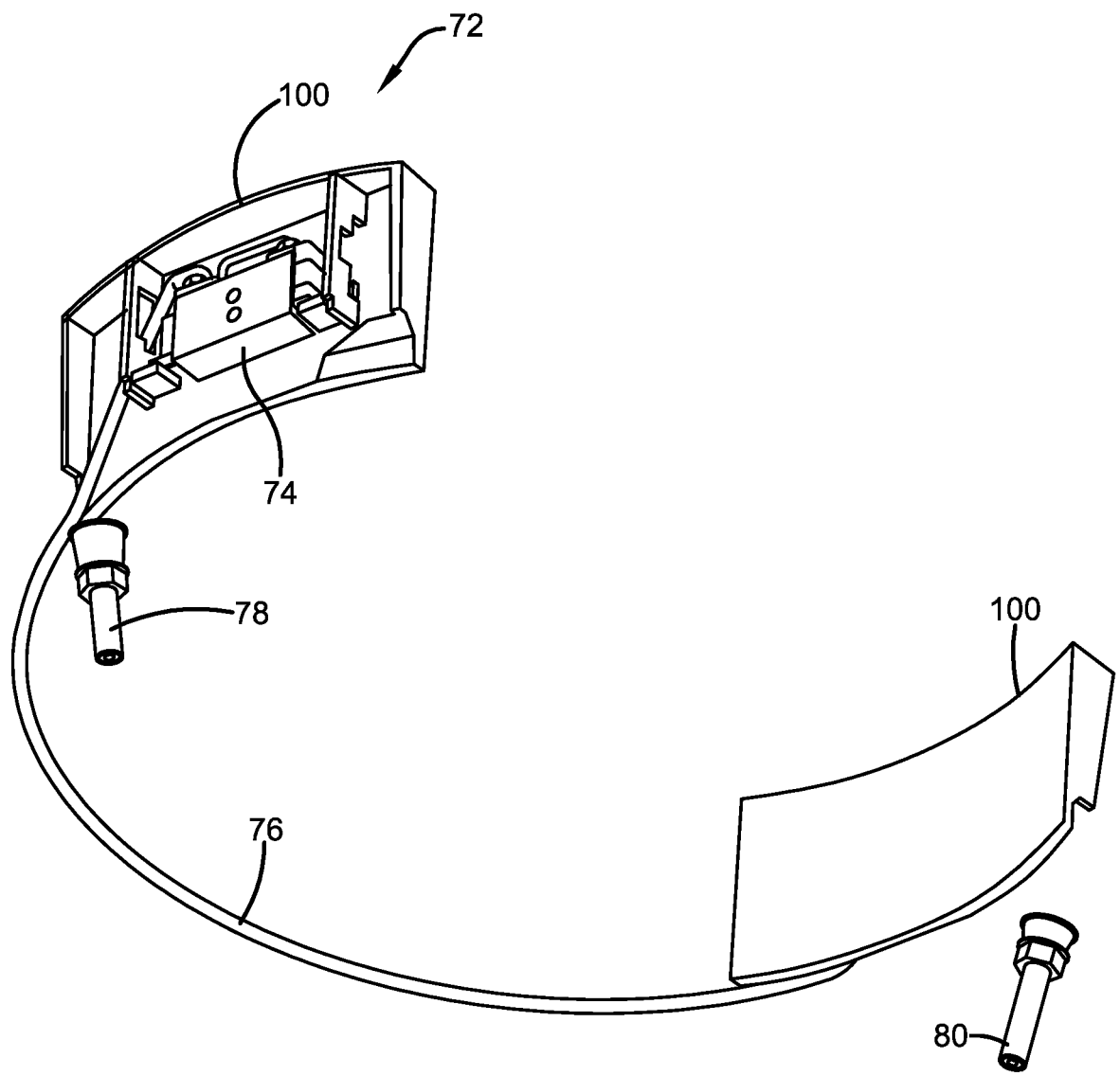
FIG. 11 is a perspective view of the AMT components shown in FIG. 9.

Turning to FIGS. 9 through 11, a second exemplary embodiment of a wheel for an AMT system of the present invention is indicated at 70. As with the first embodiment of the wheel 10, a tire (not shown) is mounted on the wheel and defines a cavity, and components of an exemplary AMT system 72 are also mounted on the wheel 10.

The AMT system 72 includes, by way of example, at least one pump 74, which preferably is a linearly-actuating or shuttle pump. Preferably, two or more pumps 74 are pneumatically connected in series about the wheel 70 through a conduit or flexible line 76. As shown in FIG. 11, a traditional valve stem 78 is provided to permit manual inflation of the tire. An AMT system inlet control valve or regulator 80 is provided, and may optionally be a valve stem control unit. Air is drawn into the AMT system 72 on demand through the inlet control valve 80, which is in fluid communication with first one of the pumps 74. The pumps 74 operate as the wheel 70 rotates and air flows from the first pump to the next pump through the conduit 76. The air thus is compressed and the air pressure amplified by the pumps 74. Upon reaching a last one of the pumps 74, the compressed air is released directly into the tire cavity.

With reference again to FIGS. 9 through 11, to accommodate the AMT system 72, the wheel 70 is formed with specific features. For example, a circumferential AMT mounting channel 82 is formed in an axially-extending wall 84 of the wheel 70 proximate or at the equatorial centerplane of the tire, and thus about mid-way between a pair of flanges 86. By forming the AMT mounting channel 82, components of the AMT system 72, such as the pumps 74, may be mounted radially inwardly of bead mounting areas 88 of the wheel.

The configuration of the AMT mounting channel 82 of the second embodiment of the wheel 70 is similar in structure and function to the AMT mounting channel 36 of the first embodiment of the wheel 10. Thus, the AMT mounting channel 70 is defined by a first adjacent wall 90, a second adjacent wall 92, and a base 94.

To provide a stable mounting area for each pump 74, a pump mounting surface 96 is formed for each respective pump. More particularly, a portion 98 of the first adjacent wall 90 and the axial wall 84 preferably is entirely removed from the wheel 70, such as by cutting or forming the wheel with an opening. The pump 74 is mounted to a plate 100 that is formed with a curvature that matches the curvature of the wheel 70, and is of a size that matches the removed portion 98. The plate 100 is disposed in the removed portion 98 and securely attached to the wheel 70 by means such as welding, mechanical fasteners, an adhesive, or the like. The pumps 14 are then pneumatically interconnected by the conduit 76, which may lie in or be secured in the AMT mounting channel 82. The second embodiment of the wheel 70 thus provides a discrete pump mounting surface 96 for each respective pump 74, which in turn enables stable and convenient mounting of the pumps on the wheel.

To enable fluid communication between the inlet control valve 80 and the pumps 74, an opening 102 preferably is formed in the wheel 70 proximate a selected one of the pumps. The inlet control valve 80 is secured to the wheel 70 at the opening 102, and a pneumatic conduit or other means is provided to enable fluid communication between the inlet control valve and the selected pump 74.

To enable a tire to be installed on the wheel 70 more easily, the AMT mounting channel 82 preferably is wider than the components of the AMT system 72, leaving a portion of the AMT mounting channel vacant or open. Thus, as the tire is installed on the wheel 70, one of the tire beads may temporarily drop into the vacant or open portion of the AMT mounting channel 82, which enables easier movement of the tire over the components of the AMT system 72, in turn providing easier installation of the tire.

In this manner, the invention provides a wheel 70 for an AMT system 72 that is formed to enable AMT system components to be mounted to the wheel radially inward of the bead seating areas 88 of the tire. Such a construction in turn enables secure and convenient mounting of AMT system components to the wheel 70 while allowing for mounting of the tire without interference. As described above, the construction of the wheel 70 allows for the mounting and fastening of multiple components of the AMT system 72, including one or more pumps 74, and an inlet control valve or regulator 80. If required, components of a tire pressure monitoring system (TPMS) may also be mounted on the wheel 70 and incorporated into the structure of the AMT mounting channel 82. The structure of the wheel 70 also enables the components of the AMT system 72 to be oriented and spaced about the wheel to provide circumferential balance for the system.

The present invention also includes a method of forming a wheel for an AMT system and a method of using a wheel in an AMT system. Each method includes steps in accordance with the description that is presented above and shown in FIGS. 1 through 11.

It is to be understood that the structure of the above-described wheel for an AMT system may be altered or rearranged, or components or steps known to those skilled in the art omitted or added, without affecting the overall concept or operation of the invention. For example, the components of the AMT system 12 and 72 may be different from those described above, including any type of pumps or any type of regulator known to those skilled in the art.

The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. A wheel for an air maintenance tire (AMT) system, the air maintenance tire system including at least one pump and a regulator, the wheel comprising:
   a body being formed with an axially-extending wall, a pair of flanges, and a pair of bead mounting areas, each bead mounting area being disposed axially inwardly proximate a respective one of the flanges;
   the axially-extending wall being formed with an AMT mounting channel, the AMT mounting channel extending circumferentially about the wheel between the flanges, wherein the AMT mounting channel is defined by a first adjacent wall, a second adjacent wall, and a base;
   a plurality of pump mounting surfaces being formed in or adjacent the AMT mounting channel, whereby the at least one pump is mounted on a respective one of the pump mounting surfaces radially inwardly of the bead mounting areas; and
   a circumferentially-extending feature formed in the second wall proximate the base of the AMT mounting channel to engage a conduit of the air maintenance tire system.

2. The wheel for an air maintenance tire system of claim 1, wherein the AMT mounting channel is of a depth that is less than the thickness of the first adjacent wall.

3. The wheel for an air maintenance tire system of claim 1, wherein at least one of the pump mounting surfaces is formed in the AMT mounting channel and the first adjacent wall.

4. The wheel for an air maintenance tire system of claim 3, wherein the at least one of the pump mounting surfaces formed in the AMT mounting channel and the first adjacent wall includes a boss structure formed on the base of the AMT mounting channel.

5. The wheel for an air maintenance tire system of claim 4, wherein the at least one of the pump mounting surfaces formed in the AMT mounting channel and the first adjacent wall includes a cutout formed in the first adjacent wall proximate the boss structure.

6. The wheel for an air maintenance tire system of claim 1, further comprising a regulator mounting surface being formed in the AMT mounting channel and the first adjacent wall.

7. The wheel for an air maintenance tire system of claim 6, wherein the regulator mounting surface includes a boss structure formed on the base of the AMT mounting channel.

8. The wheel for an air maintenance tire system of claim 7, wherein the regulator mounting surface includes a cutout formed in the first adjacent wall proximate the boss structure.

9. The wheel for an air maintenance tire system of claim 1, wherein the air maintenance tire system further comprises a valve stem, and an opening is formed in the base of the AMT mounting channel for mounting the valve stem on the wheel.

10. The wheel for an air maintenance tire system of claim 9, wherein the valve stem incorporates the regulator.

11. The wheel for an air maintenance tire system of claim 1, wherein the respective one of the pump mounting surfaces includes a plate that supports the at least one pump.

12. The wheel for an air maintenance tire system of claim 11, wherein a portion of the first adjacent wall is removed and the plate is attached to the wheel in the removed portion.

13. The wheel for an air maintenance tire system of claim 1, wherein the regulator includes an inlet control valve and an opening is formed in the wheel, whereby the inlet control valve is secured to the wheel at the opening.

14. The wheel for an air maintenance tire system of claim 1, wherein an inner diameter of the AMT mounting channel base is generally the same as an inner diameter of the first adjacent wall.

15. A wheel for an air maintenance tire (AMT) system, the air maintenance tire system including at least one pump and a regulator, the wheel comprising:
 a body being formed with an axially-extending wall, a pair of flanges, and a pair of bead mounting areas, each bead mounting area being disposed axially inwardly proximate a respective one of the flanges;
 the axially-extending wall being formed with an AMT mounting channel, the AMT mounting channel extending circumferentially about the wheel between the flanges, wherein the AMT mounting channel is defined by a first adjacent wall, a second adjacent wall, and a base;
 a plurality of pump mounting surfaces being formed in or adjacent the AMT mounting channel, whereby the at least one pump is mounted on a respective one of the pump mounting surfaces radially inwardly of the bead mounting areas, and at least one of the pump mounting surfaces is formed in the AMT mounting channel and the first adjacent wall, the at least one of the pump mounting surfaces including a pump mounting boss structure formed on the base of the AMT mounting channel; and
 a regulator mounting surface being formed in the AMT mounting channel and the first adjacent wall, the regulator mounting surface being separate from the pump mounting surfaces and including a regulator mounting boss structure formed on the base of the AMT mounting channel, the regulator mounting boss structure being separate from the pump mounting boss structure.

16. The wheel for an air maintenance tire system of claim 15, wherein the at least one of the pump mounting surfaces formed in the AMT mounting channel and the first adjacent wall includes a cutout formed in the first adjacent wall proximate the pump mounting boss structure.

17. The wheel for an air maintenance tire system of claim 15, wherein the regulator mounting surface includes a cutout formed in the first adjacent wall proximate the regulator mounting boss structure.

\* \* \* \* \*